O. H. HICKS.

Assignor to THE CHICAGO MANILA PAPER WORKS.

PAPER RECEPTACLE.

No. 10,929. Reissued May 15, 1888.

Witnesses:
Chas. E. Gaylord.
J. H. Dyrenforth.

Inventor:
Oliver H. Hicks,
By Dyrenforth & Dyrenforth,
Att'ys

THE NORRIS PETERS CO., PHOTO-LITHO., WASHINGTON, D. C.

UNITED STATES PATENT OFFICE.

OLIVER H. HICKS, OF CHICAGO, ILLINOIS, ASSIGNOR TO THE CHICAGO MANILA PAPER WORKS, OF SAME PLACE.

PAPER RECEPTACLE.

SPECIFICATION forming part of Reissued Letters Patent No. 10,929, dated May 15, 1888.

Original No. 351,980, dated November 2, 1886. Application for reissue filed March 8, 1888. Serial No. 266,641.

*To all whom it may concern:*

Be it known that I, OLIVER H. HICKS, a citizen of the United States, residing at Chicago, in the county of Cook and State of Illinois, have invented a certain new and useful Improvement in Paper Receptacles; and I hereby declare the following to be a full, clear, and exact description of the same.

My invention relates to the class of paper receptacles designed to contain merchandise, in either liquid or solid form, and usually provided with a handle and separate flat cover, or one or more extension-sides to fold over and form a flat cover.

When a paper receptacle provided with a cover of either of the foregoing descriptions is filled with a liquid, great care in carrying the receptacle is necessary to prevent the liquid from splashing out around the cover, which is not close-fitting, and does not generally answer the purpose for which it is intended in a satisfactory manner.

It is one of the objects of my invention to dispense with the usual cover and to provide other and more desirable and effective means for closing the receptacle.

A further object of my improvement is to provide a novelty in paper receptacles possessing all the advantages of former constructions, and several of such advantages in an augmented degree.

To this end my improvement consists in the general construction of the article; and it further consists in certain details of construction and combinations of parts, all as hereinafter more fully set forth and claimed.

Figure 1:
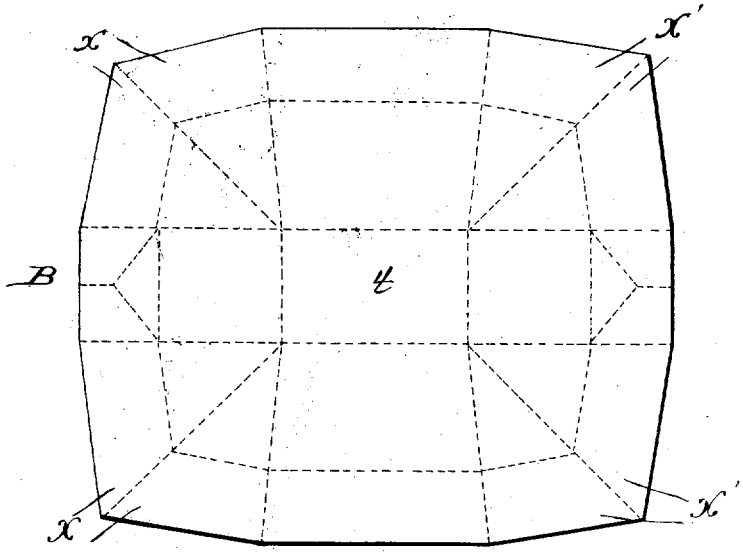
Figure 2:
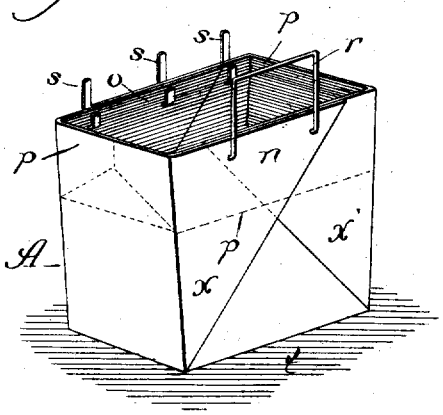
Figure 3:
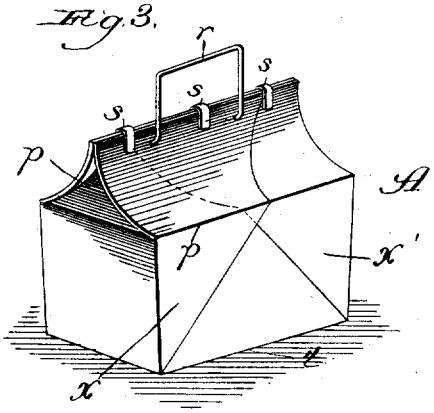
Figure 4:
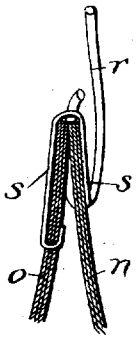

In the drawings, Figure 1 represents a single sheet of paper flattened out, which has been formed into a receptacle, the creasing produced in folding being shown by dotted lines; Fig. 2, a view in perspective of my improved receptacle opened, and provided on one edge with clamps and on the opposite edge with a bail, the creasing produced in closing the device being indicated at one end and on the side presented to view by dotted lines; Fig. 3, a similar view showing the receptacle closed; and Fig. 4, an enlarged view in cross-section of the upper part of the closed receptacle, showing the manner of clamping it.

As it is desirable to manufacture paper receptacles of this description from an integral sheet of paper, I prefer to employ a single continuous sheet in the construction of my device, as illustrated in the drawings.

A is the receptacle, having a flat base, *t*, and formed by folding an integral or continuous sheet of paper, B, to produce the rectangular shape illustrated in Fig. 2. In folding the sheet to form the receptacle, as illustrated in the drawings, the free or loose corners *x x'*, which remain after the receptacle is formed, are folded toward each other on its two opposite unsevered sides. On one such side, *o*, at its upper edge, I provide fastening mechanism in the form of a clamp or several clamps, *s*, each formed, preferably, of a soft-metal strip, such as tin or zinc. The functions of the fastening mechanism are twofold—viz., to strengthen the side of the receptacle by fastening to it the loose corners before mentioned, and to clamp or fasten the two opposite edges of the receptacle together when the same is closed, as hereinafter described, the last-named function being all important, since the purpose of my improvement is to close tightly the receptacle of the construction herein set forth in the manner described, and to hold it closed by the clamp mechanism. The clamps are adjusted to the device by passing an end from the outside through the loose corners and the side of the receptacle, a short end of each strip extending on the inside and the long end on the outside, and by bending both ends upward the loose corners and side of the receptacle are held firmly together, and the long end of the clamp extends above the top of the device sufficiently far to permit its being bent over the opposite edge of the opening when the receptacle is closed, which is accomplished by compressing the two edges together. On the side *n* of the opening of the receptacle, being the side opposite to that provided with the clamps *s*, a handle or bail, *r*, preferably of wire, is provided. The function of this bail is twofold, as, like the clamps, its ends pass through the loose corners and side of the receptacle, and are bent upward to keep the parts together, and it also affords a convenient means with which to carry the receptacle when closed.

In placing my device upon the market, I prefer, for convenience in shipping, to furnish it in the form shown in Fig. 2, with or without the creases illustrated by dotted lines at *p*, or either of such creases. This form enables the receptacle to be nested for shipment. If desired, however, they may be flattened for the purpose, which creases them across their bases and somewhat at the sides.

To close the receptacle the upper edges of the sides *o* and *n* are brought together by compressing them, and the clamps *s* are turned over upon the side *n*, to hold the two sides firmly together. The result thus far described would be produced by merely compressing the sides toward the upper edges of the device shown in Fig. 2, if unprovided with the end creases, *p*. The latter permit, with the creases *p* on the sides, the formation of a receptacle like that shown in Fig. 3, which is most readily produced by folding the paper around a block reaching to the line *p* on the side, and shaping the creases *p* on the ends by pressing inward with the fingers while bringing the opposite edges of the opening together. The receptacle is thus provided with clearly-defined extended portions of the sides to form the integral cover when the extended portions are inclined at an oblique angle to the sides in folding them toward each other to close the receptacle.

There are numerous modifications in the manner of folding the sheet B to form as many different styles of receptacle, substantially like the one illustrated, and I do not confine myself to this manner of folding, which is only one way of several I may employ.

While the clamp illustrated is the means of fastening I prefer to use in connection with my device, it is obvious that other fastening devices—as hooks, buttons, &c.—could be used for the same purpose. These are too obvious to require particular description or illustration, nor is it absolutely necessary that the folded corners shall be secured in place just in the manner stated, since they may be cemented.

What I claim as new, and desire to secure by Letters Patent, is—

1. A paper receptacle having a cover integral with it and comprising defined extensions of the sides of the receptacle, which incline at an oblique angle to the sides when brought together to close the receptacle, means for holding together the inclined cover portions, and a handle attached to the cover, substantially as described.

2. A paper receptacle having a cover integral with it and comprising defined extensions of the unsevered sides of the receptacle, which incline at an oblique angle to the sides when brought together to close the receptacle, means for holding together the inclined cover portions, and a handle attached to the cover, substantially as described.

3. A paper receptacle having a cover integral with it and comprising defined extensions of the sides of the receptacle which are folded inward from and at an oblique angle to the sides and toward each other at two opposite sides of the article, and as to the two remaining opposite sides are folded inward at an oblique angle to the sides toward each other to close the receptacle, means for holding together the folded cover portions, and a handle attached to the cover, substantially as described.

4. A paper receptacle having a cover integral with it and comprising defined extensions of the sides of the receptacle re-enforced by extended portions of the corner-flaps formed in the shaping of the article, which re-enforced extended sides are folded inward from and at an oblique angle to the sides and secured together to close the receptacle, substantially as described.

5. A paper receptacle having a cover integral with it and comprising extensions of the sides of the receptacle, divided from the receptacle proper by lines or creases, from which the cover-extensions are inclined obliquely toward each other to close the receptacle, means for holding together the inclined cover portions, and a handle on the cover, substantially as described.

6. A receptacle formed of a folded continuous sheet of paper, having the corners, formed in the shaping, folded and secured upon the receptacle, clamping mechanism, substantially as described, at one side of the receptacle, and a handle at the opposite side of the same, substantially as and for the purpose set forth.

7. A receptacle formed of a folded integral sheet of paper, having the corners, formed in the shaping, folded upon the receptacle, clamps *s* at one side of the opening, and a handle, *r*, at the opposite side of the same, the clamps and handle securing the corners in place, substantially as and for the purpose set forth.

8. A receptacle formed of a folded integral sheet of paper, having the corners, formed in the shaping, folded toward each other on opposite sides of the receptacle, clamps *s* at one side of the opening, and a handle, *r*, at the opposite side of the same, the clamps and handle securing the corners in place, substantially as and for the purpose set forth.

OLIVER H. HICKS.

In presence of—
J. W. DYRENFORTH,
CHAS. E. GAYLORD.